US012603389B2

(12) United States Patent
Sugiyama et al.

(10) Patent No.: US 12,603,389 B2
(45) Date of Patent: Apr. 14, 2026

(54) SEPARATOR FOR LEAD ACID BATTERIES

(71) Applicant: ENTEK ASIA INC, Gifu (JP)

(72) Inventors: Shoji Sugiyama, Fuwa-gun (JP);
Masayasu Wada, Fuwa-gun (JP)

(73) Assignee: ENTEK ASIA INC, Fuwa-gun (JP)

( * ) Notice: Subject to any disclaimer, the term of this patent is extended or adjusted under 35 U.S.C. 154(b) by 517 days.

(21) Appl. No.: 18/036,362

(22) PCT Filed: Nov. 20, 2020

(86) PCT No.: PCT/JP2020/043483
§ 371 (c)(1),
(2) Date: May 10, 2023

(87) PCT Pub. No.: WO2022/107334
PCT Pub. Date: May 27, 2022

(65) Prior Publication Data
US 2023/0411788 A1 Dec. 21, 2023

(51) Int. Cl.
| | |
|---|---|
| *H01M 50/44* | (2021.01) |
| *H01M 10/12* | (2006.01) |
| *H01M 50/437* | (2021.01) |
| *H01M 50/489* | (2021.01) |
| *H01M 50/494* | (2021.01) |

(52) U.S. Cl.
CPC ......... *H01M 50/44* (2021.01); *H01M 10/121* (2013.01); *H01M 50/437* (2021.01); *H01M 50/489* (2021.01); *H01M 50/494* (2021.01)

(58) Field of Classification Search
None
See application file for complete search history.

(56) References Cited

U.S. PATENT DOCUMENTS

| | | | |
|---|---|---|---|
| 5,206,100 A | 4/1993 | Muto | |
| 2006/0177730 A1 | 8/2006 | Zguris | |

FOREIGN PATENT DOCUMENTS

| | | |
|---|---|---|
| JP | H02-049348 A | 2/1990 |
| JP | H04-106869 A | 4/1992 |
| JP | H07-201310 A | 8/1995 |
| JP | 2003-242953 A | 8/2003 |

(Continued)

OTHER PUBLICATIONS

International Search Report for International Application No. PCT/JP2020/043483 dated Jan. 26, 2021 (3 sheets, 2 sheets translation, 5 sheets total).

(Continued)

*Primary Examiner* — Eli S Mekhlin

(74) *Attorney, Agent, or Firm* — Kratz, Quintos & Hanson, LLP

(57) ABSTRACT

[Problem] To provide an optimum separator that simultaneously has basic physical properties essential for the characteristics of a separator for valve-regulated lead acid batteries and liquid absorbability while taking into account the improvement of the battery capacity and battery life and the good battery assembly performance.
[Solution] The aspect ratio (average fiber length/average fiber diameter) of a glass fiber in a separator is 130 to 205, the tensile strength of the separator is 0.20 N/mm² or more, and the elongation percentage at break of the separator is 2.0% or more and less than 9.0%.

4 Claims, 1 Drawing Sheet a) SEPARATOR HAVING ELONGATION PERCENTAGE OF 2.0% OR MORE AND LESS THAN 9.0%

1. ELECTRODE
2. SEPARATOR b) SEPARATOR HAVING ELONGATION PERCENTAGE OF 9.0% OR MORE

SEPARATOR ELONGATES DOWNWARD, SO THAT WIDTH IS NARROWED BY THAT MUCH, AND ELECTRODES CANNOT BE COVERED THEREWITH.

SEPARATOR ELONGATES DOWNWARD

(56)          References Cited

FOREIGN PATENT DOCUMENTS

JP          2009-245901  A      10/2009
JP          2013-206571  A      10/2013
WO      WO-2004075315  A2  *    9/2004    .......... H01M 50/434
WO          2015/080150  A1      6/2015

OTHER PUBLICATIONS

Office Action of Japanese Patent Application No. 2019-182590
dated Aug. 22, 2023 (3 sheets).

* cited by examiner a) SEPARATOR HAVING ELONGATION PERCENTAGE OF 2.0% OR MORE AND LESS THAN 9.0%

1. ELECTRODE
2. SEPARATOR b) SEPARATOR HAVING ELONGATION PERCENTAGE OF 9.0% OR MORE

SEPARATOR ELONGATES DOWNWARD, SO THAT WIDTH IS NARROWED BY THAT MUCH, AND ELECTRODES CANNOT BE COVERED THEREWITH.

SEPARATOR ELONGATES DOWNWARD

SEPARATOR FOR LEAD ACID BATTERIES

TECHNICAL FIELD

The present invention relates to a separator for valve-regulated lead acid batteries. More particularly, the invention has its object to improve the battery capacity and longevity, which are considered important as battery characteristics, and to take into account good battery assemblability, and relates to optimization of selection of a separator material, in which the ranges of the aspect ratio (average glass fiber length/average glass fiber diameter) in the separator of a glass fiber to be used as a material, the basic physical properties of the separator (tensile strength and elongation percentage), and the liquid absorption ratio are defined.

BACKGROUND ART

Conventionally, in a valve-regulated lead acid battery, many studies have been conducted on a separator material for improving battery capacity and battery life, which are important items in battery characteristics.

As an item that greatly affects the battery capacity as a separator, it is important how to improve the adhesion between the separator, which is a member, and a battery electrode. That is, it is important how quickly an electrolyte held in the separator is supplied to the electrode plate side, and the ease of movement of the electrolyte at the interface between the electrode plate and the separator is the key point for improving the battery life.

At this time, the characteristic required for the separator interposed between the electrodes of the battery is how to swell the separator itself by allowing it to absorb a large amount of the electrolyte.

Further, at the same time, by repeating the charging/discharging reaction of the battery, the basic physical properties (tensile strength and elongation percentage) of the separator itself also have a great influence on the battery life itself.

The configuration that is actually mainly studied as the separator material is roughly divided into three patterns: (1) a separator formed only of a glass fiber, (2) a separator formed of a glass fiber and an organic fiber, and (3) a separator formed by further adding an inorganic powder to a glass fiber and an organic fiber.

In the past, it has been proposed that by forming a separator only of a glass fiber as a configuration achieving the highest liquid absorption ratio and mainly using a glass fiber having an average fiber diameter of 2 μm or less and an average fiber length of 2 mm or less as a separator material, gas permeability, which is a contradictory property, is improved while maintaining the liquid absorption ratio of the separator (see PTL 1).

Further, it has been proposed that in a separator formed only of a glass fiber similarly, by setting the tensile elongation percentage of a sheet within a range of about 9 to 15% and the density within a range of 0.11 to 0.14 g/cm³, improvement of a liquid absorption ratio and improvement of a high discharging rate are brought about (see PTL 2).

Heretofore, many patents have been issued for a separator formed of a glass fiber and an organic fiber, but it is known that by adding an organic fiber, the organic fiber is joined to a glass fiber by heat fusion to increase the strength of a sheet as compared to a separator formed of a glass fiber alone.

However, since the organic fiber itself has poor hydrophilicity, a decrease in the liquid absorption ratio of the separator is caused.

In order to compensate this, measures to make it easier to secure the liquid absorption ratio are taken by locally increasing the pore diameter of the separator using an organic fiber having a large fiber diameter (generally, a fiber having an average fiber diameter of 10 μm or more). However, on the other hand, it has another drawback in terms of battery life that the risk of the occurrence of a dendrite short-circuiting becomes high.

In order to extend the battery life, one in which a hydrophilic inorganic powder (silica powder) is blended for the purpose of decreasing the pore diameter of a separator for valve-regulated lead acid batteries using an organic fiber and preventing a dendrite short-circuiting has also been proposed (see PTL 3). However, the density of the sheet also increases, and as a result, the liquid absorption ratio decreases, resulting in also decreasing the battery capacity, and therefore, it has a drawback that it can only be used for long-life batteries with a small capacity.

In addition, when a cellulose fiber such as highly hydrophilic pulp is used, the deterioration in hydration property may be suppressed, but after the separator is incorporated into the battery, it has poor resistance to a sulfuric acid solution that is the electrolyte, and therefore, the cellulose fiber such as pulp is dissolved out to cause an adverse effect on the battery reaction. Further, when a highly hydrophilic silica powder is mixed, the silica powder itself is clogged in the separator pore, resulting in decreasing the liquid absorption ratio. Therefore, a problem still remains in the design of a conventional separator.

CITATION LIST

Patent Literature

PTL 1: JPH02-66850A
PTL 2: JPH07-201310A
PTL 3: JP2003-100276A

SUMMARY OF INVENTION

Technical Problem

PTL 1 shows in Examples that the tensile strength, which is a basic physical characteristic of the separator associated with the battery life, tends to decrease. In addition, the liquid absorption speed and the gas permeability have been improved while claiming to improve the liquid absorption ratio and the liquid absorbability, which corresponds to the liquid retention property of the separator, but the liquid absorption ratio itself has not been improved. Further, although clear ranges of the average fiber diameter and the average fiber length of the glass fiber are not particularly specified, it is stated in the text that the fiber length in the range of 0.2 mm to 2.0 mm is preferred, and therefore, the aspect ratio of the glass fiber is 200 to 1000, which includes those having a too large aspect ratio. If the aspect ratio is too large, the elongation at break of the separator becomes very large, and in the assembly step when incorporating the separator into a lead acid battery, the separator elongates when the separator is pulled out, and therefore, the width and thickness dimensions of the separator change and become narrower than the dimensions of the battery electrode, and thus, a defect that causes a battery short-circuiting in the assembly step occurs.

Further, PTL 2 describes that in the case of the separator for valve-regulated lead acid batteries in which the elongation percentage at break of the separator is 9% to 15%, and the density of the separator is 0.11 to 0.14 g/cm$^3$, which is relatively low, the amount of the liquid retained in the separator increases, but it is characterized in that the fiber length is 3 to 10 mm, which is very long.

In this case as well, in the same manner as described above, the deformation of the separator during processing becomes large due to the large elongation of the separator, the dimensional mismatch with the battery electrode occurs, and many defects during production occur. Further, since the density of the separator is as low as 0.11 to 0.14 g/cm$^3$, the amount of the liquid retained in the separator increases, but conversely, as the amount of the retained liquid increases, the weight of the separator itself increases due to the weight of the amount of the absorbed liquid. Therefore, the strength of the separator cannot withstand its own weight, and a problem that the separator collapses (the shape cannot be maintained) also occurs.

Then, PTL 3 proposes a separator in which a hydrophilic inorganic powder (silica powder) is blended therein so as not to impair the hydrophilicity in consideration of the content of the organic fiber. However, in this case, the density of the separator increases, and as a result, the volume capable of holding the electrolyte decreases, so that the liquid absorption ratio of the separator decreases, and the battery capacity also decreases.

In this manner, for the conventional separator for valve-regulated lead acid batteries, the basic physical properties of the separator directly linked to the long life of the battery and the liquid absorption ratio of the separator directly linked to the improvement of the battery capacity have been studied, but this is only for the purpose of improving the characteristics as the lead acid battery, and no study has been made to solve problems in the battery assembly step.

With respect to the glass fiber to be used for the separator material, by considering the relationship between the clear ranges of the average fiber diameter and the average fiber length (range of aspect ratio) and the elongation percentage of the separator, the characteristics of the separator can be greatly affected. In past patents in which the consideration of this relationship is insufficient, improvements are still needed to establish the conditions for selecting an optimum material for the separator for valve-regulated lead acid batteries.

The invention has been made in consideration of such circumstances, and an object of the invention is to provide a separator capable of simultaneously optimizing the basic physical properties and the liquid absorbability of the separator for valve-regulated lead acid batteries by finding optimum conditions for the aspect ratio (average fiber length/average fiber diameter) of a glass fiber in the separator, and the tensile strength and elongation percentage of the separator while taking into account the improvement of the battery capacity and battery life and the good battery assembly performance.

Solution to Problem

As a result of extensive and intensive studies for solving the above problem, optimum conditions for the aspect ratio (average fiber length/average fiber diameter) of the glass fiber in the separator, and the tensile strength and elongation percentage of the separator could be found. Then, the separator for valve-regulated lead acid batteries, in which the basic physical properties and the liquid absorbability of the separator, and the dimensional stability of the separator when assembling the separator into a valve-regulated lead acid battery are simultaneously optimized could be provided.

That is, in the separator for valve-regulated lead acid batteries of the invention, it is desirable to use only a glass fiber as a separator material to minimize components eluted in the electrolyte after the separator is incorporated in the battery and to prevent an adverse effect on the battery reaction.

The separator for valve-regulated lead acid batteries of the invention is desirably a separator, in which a glass fiber having an average fiber diameter of 2.0 μm or less and an aspect ratio (average fiber length/average fiber diameter) in the separator within a range of 130 to 205 is used, and the tensile strength of the separator is 0.20 N/mm$^2$ or more, and the elongation percentage at break thereof is within a range of 2.0% or more and less than 9.0%, and is preferably a separator, in which the elongation percentage at break is within a range of 2.5% or more and 7.5% or less.

In the separator for valve-regulated lead acid batteries, the fact that the aspect ratio becomes less than 130 means that the average fiber length of the separator becomes relatively short, and the liquid absorption ratio becomes less than 85%, so that in a valve-regulated lead acid battery in which the amount of the electrolyte is a rate-determining reaction, the life and capacity characteristics of the battery significantly decrease.

On the other hand, the fact that the aspect ratio exceeds 205 means that the average fiber length of the separator becomes relatively long, the density of the separator becomes low, and the value of the elongation percentage at break of the separator also becomes large. Therefore, the amount of the absorbed liquid increases, so that the weight of the separator itself increases due to the weight of the amount of the absorbed liquid, and thus, the strength of the separator cannot withstand its own weight, and the separator collapses or the shape cannot be maintained.

Further, when the tensile strength of the separator for valve-regulated lead acid batteries is less than 0.20 N/mm$^2$, the battery assembly performance and the basic physical properties in the charging/discharging reaction deteriorate, and the battery life decreases.

Then, with respect to the elongation percentage of the separator for valve-regulated lead acid batteries, an AGM separator is shipped mainly in a roll form at the time of shipment, and the separator is pulled out from the roll and used at the time of assembling the battery. When assembling the separator and the battery electrode, the separator is generally used so as to wrap the battery electrode in a U shape. If the elongation percentage at break of the separator is less than 2.0%, when the separator is bent into a U-shape, a crack occurs on the surface of the separator, and the product becomes defective and cannot be shipped.

On the other hand, in the charging/discharging reaction when the battery is used, the electrolyte is repeatedly absorbed and released, so that the separator expands and contracts. If the elongation percentage of a sheet measured under a room temperature condition is 9.0% or more, the separator is elongated by the force when pulling out the separator, and the dimensions in the width direction and the thickness direction of the separator change. Due to the change in the electrode plate spacing set for preventing a side short-circuiting of the battery electrodes and the dimensions thereof, an early battery short-circuiting is caused.

In this manner, in the separator for valve-regulated lead acid batteries of the invention, by setting the range of the aspect ratio in the separator of the glass fiber used as the material and the ranges of the tensile strength and elongation percentage of the separator to optimum ranges, a separator most suitable for extending the battery life and improving the battery capacity can be provided.

Note that the adjustment of the aspect ratio of the glass fiber in the separator (adjustment of fiber length) can be easily performed by adjusting the disaggregation conditions in a papermaking step.

Advantageous Effects of Invention

In the separator for valve-regulated lead acid batteries of the invention, by setting the aspect ratio (average fiber length/average fiber diameter) in the separator of the glass fiber to be used for the separator and the tensile strength and elongation percentage of the separator within optimum ranges, a separator in which the basic physical properties and the liquid absorbability of the separator for valve-regulated lead acid batteries are simultaneously optimized can be provided.

DESCRIPTION OF EMBODIMENTS

Figure 1:
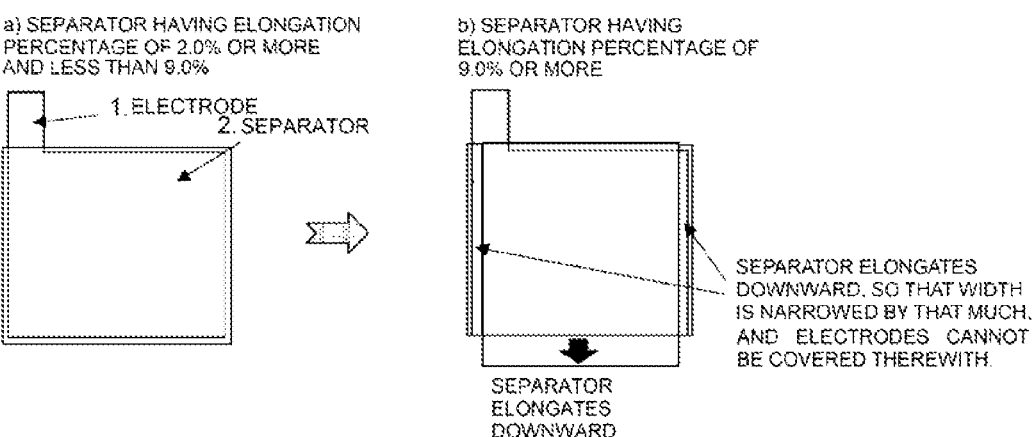
FIG. 1 is a schematic diagram showing a state of a defect at the time of assembling a battery or at the time of a battery reaction when the elongation of a separator is remarkably large.

The range of the aspect ratio (average fiber length/average fiber diameter) in the separator of the glass fiber to be used for the separator for valve-regulated lead acid batteries of the invention is preferably 130 to 205.

In the separator for valve-regulated lead acid batteries, when the aspect ratio of the glass fiber in the separator is less than 130, the liquid absorption ratio is lower than 85%, and the life and capacity characteristics of the battery significantly deteriorate.

On the other hand, when the aspect ratio exceeds 205, the elongation percentage at break of the separator becomes very large, and in the assembly step when the separator is incorporated into the lead acid battery, the separator elongates when the separator is pulled out, so that the width and thickness dimensions of the separator change. Further, also during the battery reaction, the separator repeatedly expands and contracts, so that the width and thickness dimensions of the separator change and become narrower than the dimensions of the battery electrode. Therefore, a defect in the assembly step and a defect that causes a battery short-circuiting in the battery reaction occur.

The tensile strength of the separator for valve-regulated lead acid batteries of the invention is preferably 0.20 N/mm$^2$ or more.

When the tensile strength of the separator for valve-regulated lead acid batteries is lower than 0.20 N/mm$^2$, the battery assembly performance and the basic physical properties in the charging/discharging reaction deteriorate, and the battery life decreases.

The range of the elongation percentage of the separator for valve-regulated lead acid batteries of the invention is preferably within the range of 2.0'% or more and less than 9.0%, and more preferably within the range of 2.5% or more and 7.5% or less.

An AGM separator is shipped mainly in a roll form at the time of shipment. At this time, if the elongation percentage is less than 2.0%, a crack occurs on the surface of the separator, and the product becomes defective and cannot be shipped.

On the other hand, in the charging/discharging reaction when the battery is used, the electrolyte is repeatedly absorbed and released, so that the separator expands and contracts. The separator with an elongation percentage of 9.0% or more as measured under a room temperature condition elongates downward with the battery reaction, and the width of the separator is narrowed, and therefore, a deviation from the width of the electrode plate occurs.

EXAMPLES

The invention will be described more specifically below with reference to Examples and Comparative Examples, but the invention is not limited to the following Examples without departing from the gist thereof.

[Production of Separator Sheet]

Separator sheets (all hand-made products) of Examples 1 to 6 and Comparative Examples 1 to 5 were produced by the following procedure.

15 g of each of various glass fibers (C glass) was put in a container of a mixer (National Cooking Mixer MX-915C manufactured by National Panasonic), and water was added to 1000 mL. At this time, the pH in the container was adjusted to 3.0. The value of a slidac connected to the mixer was set to 70 to 150 V, and the mixture was subjected to disaggregation for 30 seconds to 20 minutes. After disaggregation, all the water containing the glass fiber in the mixer container was put into a TAPPI apparatus (hand-made sheet making apparatus) containing water at pH 3.0, followed by mixing with a stirring rod, and then, dehydration, thereby producing a wet paper sheet. Thereafter, the sheet was dried in a dryer (drying conditions: 120° C., 1 hour), thereby producing a separator sheet (thickness: 1 mm).

For the glass fibers in the produced separator sheets (after forming separator sheets), the average fiber diameter and the average fiber length were measured by the following methods.

The results are shown in Table 1.

[Average Fiber Diameter (μm)]

On the separator sheet (300 mm×200 mm), samples of about 5 mm×5 mm square were collected from 9 locations (upper row: 3 locations, middle row: 3 locations, lower row: 3 locations). These samples were photographed with a scanning electron microscope (SEM) (2000×) and printed out, and then, a line was drawn diagonally in the electron micrographs, and the fiber diameter of a fiber overlapping this line was measured with a scale (30 to 40 fibers/sheet×9 locations=about 350 fibers/sample).

[Average Fiber Length (μm)]

The measurement was performed using a Diamscope measurement apparatus manufactured by Cottonscope Pty Ltd. (analysis software Ver. 2.84).

For the produced separator sheets, the tensile strength, elongation percentage, and liquid absorption ratio were measured by the following methods.

The results are shown in Table 1.

[Tensile Strength (N/mm$^2$)]

The separator sheet was cut to a size of 250 mm×10 mm, and the tensile strength (breaking strength, N/mm$^2$) was measured under the conditions of a crosshead speed of 25 mm/min and a chuck distance of 100 mm using an autograph (manufactured by Shimadzu Corporation).

7

8

[Elongation Percentage (%)]

The elongation percentage (%) at break in the tensile strength measurement was measured.

[Liquid Absorption Ratio ( )]

The separator sheet was cut to a size of 250 mm×10 mm, and enough water (24° C.) was placed in a petri dish, and the cut sheet was soaked therein for 60 minutes, and thereafter, the sheet was pulled out of the water and held for 5 minutes, and then, a difference (B-A) between the sample weight A before soaking in water and the sample weight B after soaking in water was determined, and "[(B-A)/A]×100" was defined as the liquid absorption ratio ( ).

The tensile strength was 0.20 N/mm² or more required for the separator for valve-regulated lead acid batteries, but the elongation percentage was less than 2.0%. Further, the aspect ratio of the glass fiber was also less than 130, and therefore, the liquid absorption ratio was also less than 85%.

Comparative Example 2

The separator sheet of Comparative Example 2 is a separator sheet, in which the aspect ratio of the glass fiber is 121, the tensile strength is 0.12 N/mm², and the elongation percentage is 0.8%, and which is composed of a single glass fiber.

TABLE 1

| Material | Item | Unit | Example 1 | Example 2 | | Example 3 | | Example 4 | | Example 5 | Example 6 | Comparative Example 1 | Comparative Example 2 | Comparative Example 3 | Comparative Example 4 | Comparative Example 5 | |
|---|---|---|---|---|---|---|---|---|---|---|---|---|---|---|---|---|---|
| Formulation | Average fiber diameter | μm | 0.8 | 0.6 | 0.8 | 0.8 | 3.8 | 0.6 | 3.8 | 0.5 | 2.0 | 0.8 | 0.8 | 0.8 | 0.5 | 0.8 | 3.8 |
| Glass fiber | Blending ratio | % | 100 | 50 | 50 | 70 | 30 | 50 | 50 | 100 | 100 | 100 | 100 | 100 | 100 | 70 | 30 |
| Separator | Blending configuration of glass fiber | — | Single | Composite | | Composite | | Composite | | Single | Single | Single | Single | Single | Single | Composite | |
| | Average fiber diameter of glass fiber | μm | 0.8 | 0.7 | | 1.1 | | 0.9 | | 0.5 | 2.0 | 0.8 | 0.8 | 0.8 | 0.5 | 1.1 | |
| | Average fiber length of glass fiber | μm | 145 | 126 | | 141 | | 155 | | 111 | 265 | 97 | 100 | 106 | 138 | 121 | |
| | Aspect ratio (average fiber length/average fiber diameter) of glass fiber | — | 174 | 190 | | 130 | | 176 | | 205 | 133 | 117 | 121 | 127 | 255 | 112 | |
| | Tensile strength | N/mm² | 0.62 | 1.07 | | 0.81 | | 0.62 | | 0.41 | 0.51 | 0.24 | 0.12 | 0.26 | 0.46 | 0.51 | |
| | Elongation percentage | % | 8.3 | 2.7 | | 2.3 | | 3.8 | | 8.5 | 5.9 | 0.4 | 0.8 | 2.7 | 11.2 | 1.8 | |
| | Liquid absorption ratio | % | 93.1 | 86.5 | | 87.3 | | 88.4 | | 88.3 | 91.2 | 82.6 | 83.4 | 83.8 | 90.8 | 84.7 | |

Examples 1 to 6

The separator sheets of Examples 1 to 6 are separator sheets, in which the aspect ratio of the glass fiber is 130 to 205, the tensile strength is 0.41 to 1.07 N/mm², and the elongation percentage is 2.3 to 8.5%, and which are composed of a single glass fiber or a composite fiber (one obtained by mixing two or more types of glass fibers having different average fiber diameters).

The liquid absorption ratio showed 85% or more while sufficiently maintaining the basic physical properties (tensile strength: 0.20 N/mm² or more, elongation percentage: 2.0% or more and less than 9.0%) required for the separator for valve-regulated lead acid batteries.

It was found that the separator sheets of Examples 1 to 6 all exhibit optimum basic physical properties (tensile strength and elongation percentage) and liquid absorbability.

Comparative Example 1

The separator sheet of Comparative Example 1 is a separator sheet, in which the aspect ratio of the glass fiber is 117, the tensile strength is 0.24 N/mm², and the elongation percentage is 0.4%, and which is composed of a single glass fiber.

The tensile strength was less than 0.20 N/mm² required for the separator for valve-regulated lead acid batteries, and also the elongation percentage was less than 2.0%. The aspect ratio of the glass fiber was less than 130, and also the liquid absorption ratio was less than 85%.

Comparative Example 3

The separator sheet of Comparative Example 3 is a separator sheet, in which the aspect ratio of the glass fiber is 127, the tensile strength is 0.26 N/mm², and the elongation percentage is 2.7%, and which is composed of a single glass fiber.

The tensile strength was 0.20 N/mm² or more required for the separator for valve-regulated lead acid batteries, and also the elongation percentage was within the range of 2.0% or more and less than 9.01, but the aspect ratio of the glass fiber was less than 130, and the liquid absorption ratio was less than 851.

Comparative Example 4

The separator sheet of Comparative Example 4 is a separator sheet, in which the aspect ratio of the glass fiber is 255, the tensile strength is 0.46 N/mm², and the elongation percentage is 11.2%, and which is composed of a single glass fiber.

The tensile strength was 0.20 N/mm² or more required for the separator for valve-regulated lead acid batteries, and the liquid absorption ratio was 85% or more, but the aspect ratio of the glass fiber exceeded 205, and therefore, the elongation percentage exceeded 9.0%.

Comparative Example 5

The separator sheet of Comparative Example 5 is a separator sheet, in which the aspect ratio of the glass fiber is 112, the tensile strength is 0.51 N/mm², and the elongation percentage is 1.8%, and which is composed of a composite fiber (one obtained by mixing two or more types of glass fibers with different average fiber diameters).

The tensile strength was 0.20 N/mm² or more required for the separator for valve-regulated lead acid batteries, but the elongation percentage was less than 2.0%, and also the aspect ratio of the glass fiber was less than 130. The liquid absorption ratio was also less than 851.

INDUSTRIAL APPLICABILITY

In the separator for valve-regulated lead acid batteries of the invention, by setting the aspect ratio (average fiber length/average fiber diameter) in the separator of the glass fiber to be used for the separator and the tensile strength and elongation percentage of the separator within specific ranges, an optimum separator that can simultaneously have basic physical properties and liquid absorbability required for the separator for valve-regulated lead acid batteries can be provided.

REFERENCE SIGNS LIST

1: electrode

2: separator

The invention claimed is:

1. A separator for valve-regulated lead acid batteries, comprising a glass fiber, wherein the glass fiber in the separator has an average fiber diameter of 2 μm or less, the glass fiber in the separator has an aspect ratio of an average fiber length/average fiber diameter within a range of 130 to 205, the separator has a tensile strength of 0.20 N/mm² or more, and the separator has an elongation percentage at break within a range of 2.0% or more and less than 9.0%.

2. The separator for valve-regulated lead acid batteries according to claim 1, wherein only the glass fiber is a constituent material of the separator.

3. The separator for valve-regulated lead acid batteries according to claim 1, wherein the separator has a liquid absorption ratio of 85% or more.

4. A valve-regulated lead acid battery using a separator for valve-regulated lead acid batteries, wherein the separator for valve-regulated lead acid batteries is formed of a glass fiber, the glass fiber in the separator has an average fiber diameter of 2 μm or less, the glass fiber in the separator has an aspect ratio of an average fiber length/average fiber diameter within a range of 130 to 205, the separator has a tensile strength of 0.20 N/mm² or more, and the separator has an elongation percentage at break within a range of 2.0% or more and less than 9.0%.

* * * * *